(12) United States Patent
Hu et al.

(10) Patent No.: US 11,442,895 B2
(45) Date of Patent: Sep. 13, 2022

(54) METHOD FOR COPYING DATA, ELECTRONIC DEVICE AND COMPUTER PROGRAM PRODUCT

(71) Applicant: EMC IP Holding Company LLC, Hopkinton, MA (US)

(72) Inventors: Bo Hu, Chengdu (CN); Qian Wu, Chengdu (CN); Jing Ye, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 97 days.

(21) Appl. No.: 17/029,709

(22) Filed: Sep. 23, 2020

(65) Prior Publication Data

US 2022/0027311 A1 Jan. 27, 2022

(30) Foreign Application Priority Data

Jul. 27, 2020 (CN) .......................... 202010730268.6

(51) Int. Cl.
  *G06F 16/00* (2019.01)
  *G06F 16/11* (2019.01)
  *G06F 11/14* (2006.01)
  *G06F 16/174* (2019.01)

(52) U.S. Cl.
  CPC ........ *G06F 16/128* (2019.01); *G06F 11/1451* (2013.01); *G06F 11/1464* (2013.01); *G06F 16/1756* (2019.01)

(58) Field of Classification Search
  None
  See application file for complete search history.

(56) References Cited

U.S. PATENT DOCUMENTS

| | | | |
|---|---|---|---|
| 7,886,119 B1 * | 2/2011 | Cameron | G06F 3/0689 711/114 |
| 8,412,688 B1 * | 4/2013 | Armangau | G06F 16/128 707/703 |
| 9,280,555 B1 | 3/2016 | Bono et al. | |
| 9,330,155 B1 | 5/2016 | Bono et al. | |
| 2011/0178972 A1 * | 7/2011 | Navarro | G06F 11/3419 706/47 |
| 2015/0186488 A1 * | 7/2015 | Fischer | G06F 11/1471 707/615 |

FOREIGN PATENT DOCUMENTS

| | | | | |
|---|---|---|---|---|
| CN | 102378969 A | * | 3/2012 | ......... G06F 3/0608 |
| CN | 105045541 A | * | 11/2015 | ............ G06F 3/06 |
| JP | 4292882 B2 | * | 7/2009 | ......... G06F 11/1448 |
| JP | 4809040 B2 | * | 11/2011 | ......... G06F 11/1469 |
| KR | 20040071693 A | * | 8/2004 | ............ G06F 12/00 |

* cited by examiner

*Primary Examiner* — Bai D Vu
(74) *Attorney, Agent, or Firm* — BainwoodHuang

(57) ABSTRACT

Techniques for replicating data involve: acquiring a first snapshot of a data block set, the first snapshot being a snapshot before a first subset of the data block set starts to be replicated; acquiring a second snapshot of the data block set, the second snapshot being a snapshot of the data block set when replication of the first subset is completed; and determining, based on a difference between the second snapshot and the first snapshot, a second subset of the data block set, the second subset being different from the first subset. Accordingly, such techniques can improve data protection efficiency in asynchronous replication.

18 Claims, 6 Drawing Sheets

_US 11,442,895 B2_

METHOD FOR COPYING DATA, ELECTRONIC DEVICE AND COMPUTER PROGRAM PRODUCT

CROSS-REFERENCE TO RELATED APPLICATION

This application claims priority to Chinese Patent Application No. CN202010730268.6, on file at the China National Intellectual Property Administration (CNIPA), having a filing date of Jul. 27, 2020 and having "METHOD FOR COPYING DATA, ELECTRONIC DEVICE AND COMPUTER PROGRAM PRODUCT" as a title, the contents and teachings of which are herein incorporated by reference in their entirety.

TECHNICAL FIELD

Embodiments of the present disclosure relate to the field of data processing, and in particular, to a method, an electronic device, and a computer program product for replicating data.

BACKGROUND

With the development of data storage technologies, data storage devices have been capable of providing users with huge data storage capacities. In order to strengthen the protection of stored data and prevent data loss due to various reasons, users often need to back up data stored on a source device, especially backing up data on a target device located in a remote location, in order to handle various emergencies.

Asynchronous replication is a frequently used method of data replication. When performing asynchronous replication, original replication needs to be performed first, that is, original data on the source device is completely replicated to the target device. After the original replication is completed, effective data backup can be realized merely by periodically performing incremental replication (only replicating updated data) of the data on the source device. However, when the original data is large (for example, 10 TB or 20 TB), limited by network transmission bandwidth or cost, original replication may take a long time and may also affect subsequent incremental backups. This situation greatly reduces the efficiency of data protection and increases the possibility of data loss.

SUMMARY OF THE INVENTION

Embodiments of the present disclosure provide a method, an electronic device, and a computer program product for replicating data.

In a first aspect of the present disclosure, a method for replicating data is provided. The method includes: acquiring a first snapshot of a data block set, the first snapshot being a snapshot before a first subset of the data block set starts to be replicated; acquiring a second snapshot of the data block set, the second snapshot being a snapshot of the data block set when replication of the first subset is completed; and determining, based on a difference between the second snapshot and the first snapshot, a second subset of the data block set, the second subset being different from the first subset.

In a second aspect of the present disclosure, an electronic device is provided. The electronic device includes: a processor; and a memory storing computer program instructions, wherein the processor runs the computer program instructions in the memory to control the electronic device to perform actions including: acquiring a first snapshot of a data block set, the first snapshot being a snapshot before a first subset of the data block set starts to be replicated; acquiring a second snapshot of the data block set, the second snapshot being a snapshot of the data block set when replication of the first subset is completed; and determining, based on a difference between the second snapshot and the first snapshot, a second subset of the data block set, the second subset being different from the first subset.

In a third aspect of the present disclosure, a computer program product is provided. The computer program product is tangibly stored in a non-transitory computer storage medium and includes machine-executable instructions, wherein the machine-executable instructions, when executed by a device, cause the device to perform actions. The actions include: acquiring a first snapshot of a data block set, the first snapshot being a snapshot before a first subset of the data block set starts to be replicated; acquiring a second snapshot of the data block set, the second snapshot being a snapshot of the data block set when replication of the first subset is completed; and determining, based on a difference between the second snapshot and the first snapshot, a second subset of the data block set, the second subset being different from the first subset.

It should be understood that the summary of the invention is neither intended to identify key or essential features of the embodiments of the present disclosure, nor intended to limit the scope of the present disclosure. Other features of the present disclosure will become readily understandable from the following description.

BRIEF DESCRIPTION OF THE DRAWINGS

The above and other objects, features, and advantages of the embodiments of the present disclosure will become readily understandable by the following detailed description with reference to the accompanying drawings. In the accompanying drawings, a plurality of embodiments of the present disclosure are illustrated by way of example and not limitation, where.

DETAILED DESCRIPTION

Figure 1:
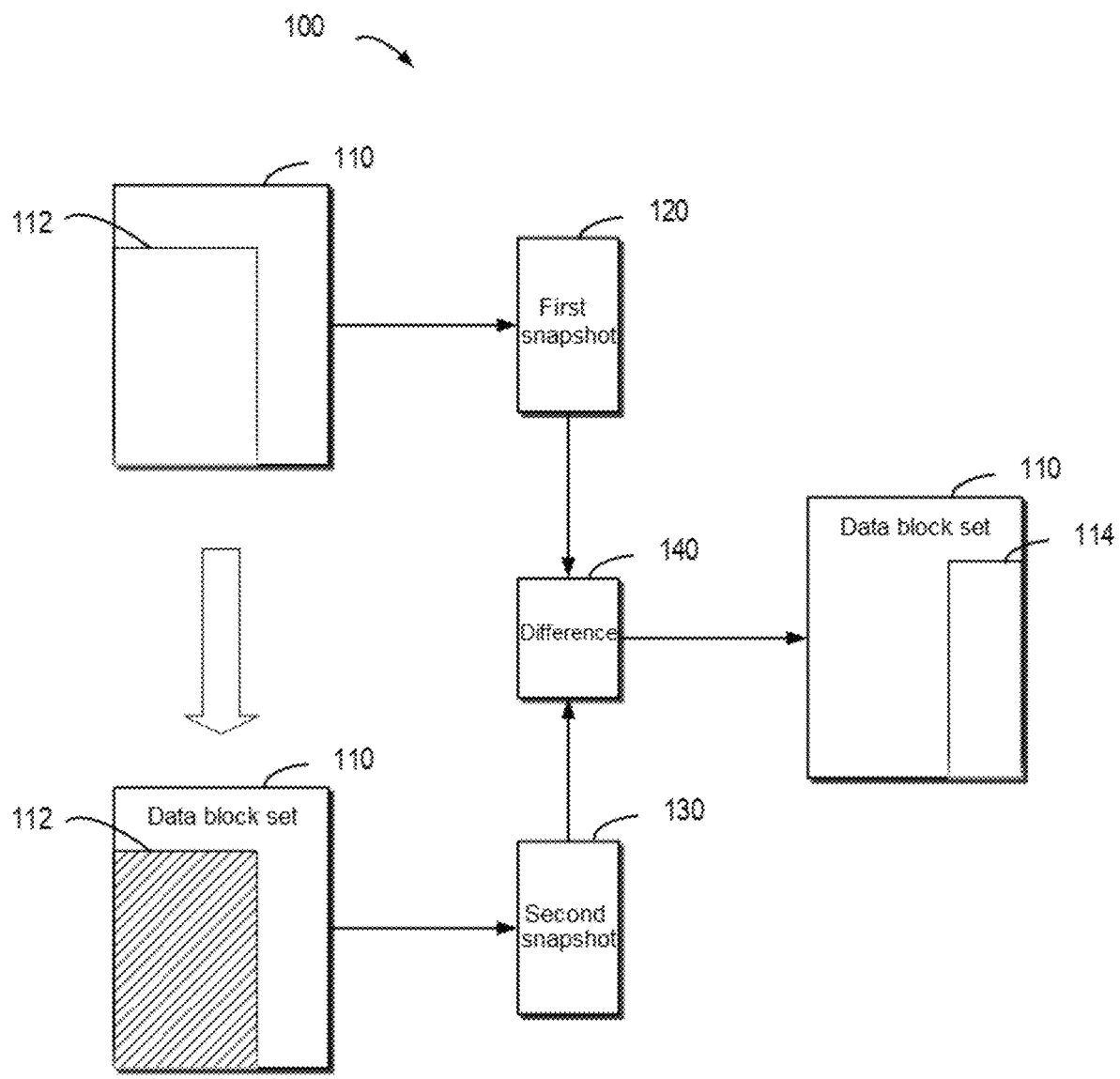
FIG. 1 shows a schematic diagram of example environment 100 for replicating data according to some embodiments of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The concept of the present disclosure will now be explained with reference to various example embodiments shown in the drawings. It should be understood that these embodiments are described only for the purpose of enabling a person skilled in the art to better understand and then implement the present disclosure, instead of limiting the scope of the present disclosure in any way. It should be noted that similar or identical reference signs may be used in the figures where feasible, and similar or identical reference signs may indicate similar or identical elements. Those skilled in the art will understand that from the following description, alternative embodiments of the structures and/or methods described herein may be adopted without departing from the principles and concepts of the present disclosure described.

In the context of the present disclosure, the term "including" and its various variants can be understood as open-ended terms, which mean "including but not limited to"; the term "based on" can be understood as "based at least in part on"; the term "one embodiment" can be understood as "at least one embodiment"; and the term "another embodiment" can be understood as "at least one other embodiment." Other terms that may appear but are not mentioned here, unless explicitly stated, should not be interpreted or limited in a manner that is contrary to the concept on which the embodiments of the present disclosure are based.

As mentioned above, when performing asynchronous replication, original replication needs to be performed first, that is, original data on a source device is completely replicated to a target device. After the original replication is completed, effective data backup can be realized merely by periodically performing incremental replication (only replicating updated data) of the data on the source device. However, when the original data is large (for example, 10 TB or 20 TB), limited by network transmission bandwidth or cost, original replication may take a long time and may also affect subsequent incremental backups. This situation greatly reduces the efficiency of data protection and increases the possibility of data loss.

A solution for replicating data is proposed in the embodiments of the present disclosure to solve the above problem and/or other potential problems. According to this solution, a first snapshot of a data block set can be obtained, where the first snapshot is a snapshot before a first subset of the data block set starts to be replicated. According to this solution, a second snapshot of the data block set can be obtained, where the second snapshot is a snapshot obtained when replication of the first subset of the data block set has been completed. According to this solution, a second subset of the data block set can be determined based on a difference between the second snapshot and the first snapshot, where the second subset is different from the first subset. In this way, the solution can improve the data protection efficiency of a storage system using asynchronous replication.

Basic principles and implementations of the present disclosure are illustrated below with reference to the drawings. It should be understood that example embodiments are provided only to enable those skilled in the art to better understand and then implement the embodiments of the present disclosure, and not to limit the scope of the present disclosure in any way.

FIG. 1 shows a schematic diagram of example environment 100 for replicating data according to embodiments of the present disclosure. As shown in FIG. 1, environment 100 includes data block set 110. Data block set 110 is a data block set to be replicated stored in an electronic device. The electronic device can be a computer, a server, or any other device that can be used for data storage.

Data block set 110 includes first subset 112. The electronic device can obtain first snapshot 120 of data block set 110. First snapshot 120 may be a copy of data block set 110 when first snapshot 120 is created, or may be a converted form of data block set 110 when first snapshot 120 is created. In some embodiments, data blocks in first subset 112 may be determined based on operating frequencies of the data blocks in data block set 110. For example, a data block having an operating frequency lower than a threshold frequency may be determined as the data block in first subset 112. In a first replicating stage, the electronic device may replicate, to the target device, data in the data blocks in first subset 112 when first snapshot 120 is created.

During the replication of first subset 112 to the target device, the data blocks in the data block set 110 may still be updated by a user (for example, modification, deletion, or addition). Therefore, after replicating first subset 112 when first snapshot 120 is created to the target device, the electronic device may obtain second snapshot 130 of data block set 110.

In some embodiments, some data blocks in data block set 110 may be updated by the user during the replication of first subset 112, so the electronic device may obtain difference 140 between second snapshot 130 and first snapshot 120 to determine which data blocks have changed. Since the electronic device only replicates the data blocks with a low operating frequency included in first subset 112 to the target device, the electronic device may determine both data blocks that have not been replicated in data block set 110 and data blocks that are determined to have changed in data block set 110 as data blocks of second subset 114.

In a second replicating stage, the electronic device may replicate, to the target device, the data blocks in second subset 114 when second snapshot 130 is created, to complete the original replication of the data block set. Although the electronic device only performs two replication stages in the above description, it should be understood that the electronic device may also use more similar replication stages to complete the original replication of data block set 110. In this way, by dividing the original replication into multiple replication stages, multiple snapshots of data block set 110 may be obtained, the time interval between the snapshots is reduced, and the data protection efficiency of the storage system is increased.

It should be understood that the electronic device may include a processor and a memory. In some embodiments, computer programs may be stored in the memory, and instructions of these programs may be executed by the processor to control operations of the electronic device. It should be understood that the electronic device may also include some other modules and/or devices, such as communication modules, input and output devices, and so on.

Figure 2:
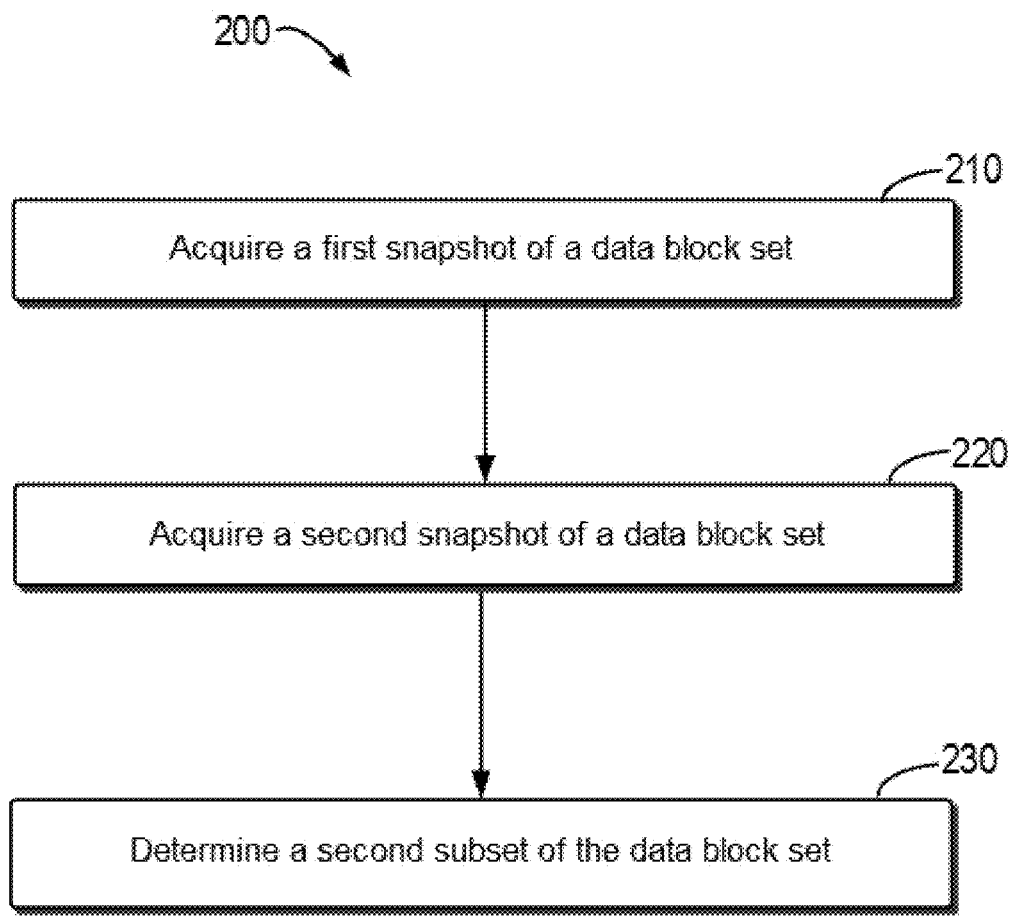
FIG. 2 shows a flow chart of method 200 for replicating data according to some embodiments of the present disclosure.

FIG. 2 shows a flow chart of method 200 for replicating data according to embodiments of the present disclosure. It should be understood that at least a part of method 200 may be executed by the electronic device described above. Method 200 may also include blocks that are not shown and/or may omit blocks that are shown. The scope of the present disclosure is not limited in this regard.

At block 210, the electronic device may obtain first snapshot 120 of data block set 110, where first snapshot 120 is a snapshot before first subset 112 starts to be replicated. In some embodiments, the electronic device may obtain an operating frequency of a data block in data block set 110. The electronic device may determine data blocks having an operating frequency lower than a threshold frequency as data blocks in the first subset. For example, the electronic device may obtain a data write-in frequency of a data block in data block set 110, and determine data blocks whose write-in times per hour are less than 30 as the data blocks in first subset 112. In this way, the electronic device may replicate data blocks that are not frequently used in data block set 110 to the target device in a short time to complete the first stage of replication, so that the next snapshot can be obtained earlier, thereby reducing the risk of losing a lot of data.

At block 220, the electronic device may obtain second snapshot 130 of data block 110, where second snapshot 130 is a snapshot obtained when the replication of first subset 112 has been completed. In some embodiments, during the replication of first subset 112 to the target device, the user may update data in data block set 110. Therefore, second snapshot 130 may reflect the state of updated data block set 110. In this way, by acquiring the latest snapshot of data block set 110, the electronic device can minimize the amount of data loss when a problem occurs in the storage system.

At block 230, the electronic device may determine second subset 114 of data block set 110 based on difference 140 between second snapshot 130 and first snapshot 120. In some embodiments, the electronic device may compare second snapshot 130 with first snapshot 120 to determine data blocks that have changed during the replication of first subset 112. For example, the electronic device may determine a data block associated with difference 140 as a data block in a third subset. In this way, the electronic device may quickly and accurately determine which data blocks have been updated. It should be understood that during the replication of first subset 112, there may be no updated data in data block set 110. In this case, the third subset may not include any data block.

In some embodiments, since the electronic device only replicates first subset 112 to the target device during the replication process of the first stage, the electronic device may also determine a fourth subset of data block set 110, and the fourth subset includes data blocks that have not been replicated in data block set 110. For example, the electronic device may determine data blocks in data block set 110 other than those in first subset 112 as data blocks in the fourth subset. In this way, the electronic device may determine the data blocks that have not been replicated in data block set 110.

In some embodiments, the electronic device may merge the third subset and the fourth subset to obtain second subset 114. For example, if during the replication of first subset 112, no data in data block set 110 is updated (that is, the third subset does not include any data block), then the fourth subset is regarded as the second subset; and if data in data block set 110 is updated during the replication of first subset 112, then the data blocks in the third subset and the fourth subset are merged as data blocks in second subset 114. In this way, second subset 114 may be replicated to the target device, so that the electronic device may complete the second stage of the original replication in a short time, thereby reducing the time for subsequent incremental replicating and improving the efficiency of data protection.

The schematic diagram of determining second subset 114 according to difference 140 between first snapshot 120 and second snapshot 130 will be described in detail below with reference to FIG. 3. Before starting to replicate, the electronic device obtains first snapshot 120 of data block set 110. The electronic device may create bitmap 150 based on the first snapshot. Each bit in bitmap 150 may be associated with each data block in data block set 110. Taking FIG. 3 as an example, bitmap 150 may include 16 bits, the data block set may include 16 data blocks, and each data block is associated with a bit in bitmap 150. The electronic device may obtain operating frequencies of these 16 data blocks, and set the bit associated with a data block having an operating frequency lower than the threshold operating frequency as 1, and set other bits as 0. First subset 112 may include the data blocks flagged as 1 in the bitmap. In this way, the electronic device may accurately identify the data blocks for the first subset.

In some embodiments, the electronic device replicates the data blocks in first subset 112 to the target device. For example, the electronic device replicates a data block associated with a bit flagged as 1 in bitmap 150 to the target device. Once the replication of the data block is completed, the associated bit is set to 0 to indicate that the data block has been replicated. Then, the electronic device continues to replicate other data blocks flagged as 1 to the target device, and sets the bits of the bitmap associated with the data blocks to 0. This is repeated until all the bits in bitmap 150 are 0. In this way, the electronic device may first replicate data blocks with lower operating frequencies to the target device to complete the first stage of replication, thereby shortening the time interval for obtaining the next snapshot.

In some embodiments, the electronic device may create bitmap 160, and each bit in bitmap 160 has an opposite value to a corresponding bit in bitmap 150. For example, if the first bit in bitmap 150 is 1, then the first bit in bitmap 160 is set to 0, and if the second bit in bitmap 150 is 0, the second bit in bitmap 160 is set to 1, and so on. In this way, the electronic device may identify the data blocks that have not been replicated during the first stage in order to complete subsequent operations.

In some embodiments, the electronic device may obtain second snapshot 130 of data block set 110 after replication of first subset 112 has been completed. The electronic device may determine data blocks that have changed during the replication of first subset 112 based on difference 140 between second snapshot 130 and first snapshot 120. For example, the electronic device may create bitmap 170, and set a bit associated with the changed data block to 1, and set a bit associated with an unchanged data block to 0. Still taking FIG. 3 as an example, by comparing first snapshot 130 and second snapshot 120, the electronic device may determine, based on difference 140 between the two, that the user has updated data in 5 data blocks during the replication of first subset 112, and therefore, the electronic device sets the bits associated with these 5 data blocks in bitmap 170 to 1, and sets other bits to 0. In this way, the electronic device may identify the updated data blocks, so that the updated data blocks can be replicated to the target device in the subsequent replication stage.

In some embodiments, the electronic device may create bitmap 180. Each bit in bitmap 180 is the result of an OR operation between bitmap 160 and bitmap 170. As shown in FIG. 3, the first bits in bitmap 160 and bitmap 170 are both 0, then the first bit in bitmap 180 is set to 0; and the second bits in bitmap 160 and bitmap 170 are both 1, then the second bit in bitmap 180 is set to 1, and so on. Since bitmap 180 flags both of bits associated with the updated data blocks and bits associated with the data blocks that have not been replicated as 1, the data blocks associated with bits flagged as 1 are all included in second subset 114.

Similar to the replication in the first stage, the electronic device may replicate the data blocks associated with the bits flagged as 1 in bitmap 180 to the target device in the second stage. Once the data blocks are replicated, the associated bits are set to 0 to indicate that the data blocks have been replicated; and so on. Once all the bits in bitmap 180 are 0, it means that second subset 114 has been completely replicated to the target device, that is, the complete original replication of data block set 110 has been completed. In this way, by dividing the original replication into multiple replication stages, the latest snapshot of data block set 110 can be obtained, thereby minimizing data loss caused by data rollback, reducing the time required for subsequent incremental replication, and improving the efficiency of data protection.

Alternatively, in order to simplify the operation process, the electronic device may not create bitmap 180, but directly modify bitmap 150 after replication of first subset 112 has been completed, that is, replace all of the bits in bitmap 150 respectively with bits obtained by performing OR operation on bitmap 160 and bitmap 170. In this way, the electronic device only needs to always make sure that data blocks flagged as 1 in bitmap 150 are replicated to the target device without the need to pay attention to the state of other bitmaps, thereby simplifying the operation process.

Figure 3:
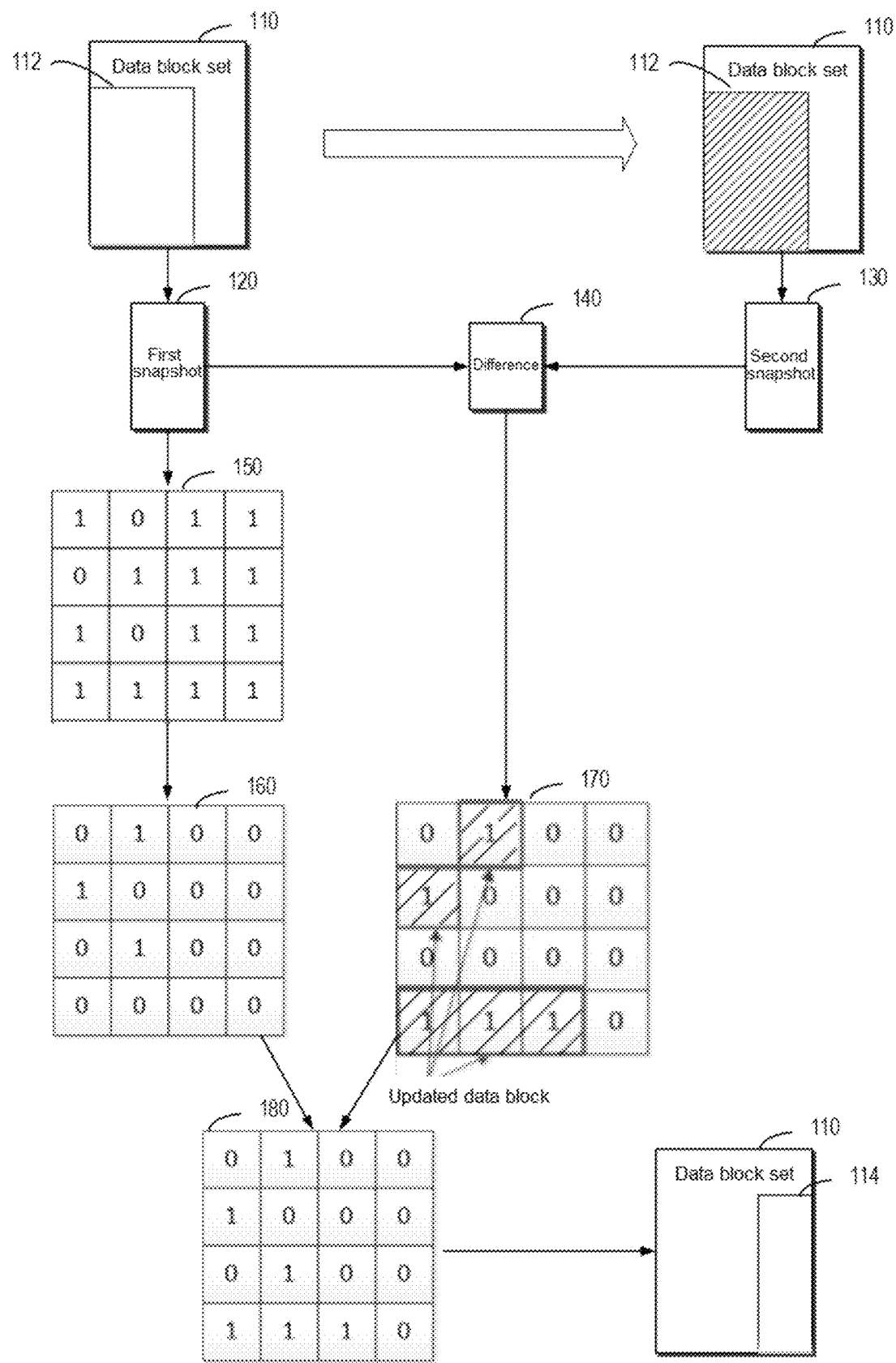
FIG. 3 shows a schematic diagram of determining a second subset according to some embodiments of the present disclosure.

Although in the example shown in FIG. 3, data block set 110 includes 16 data blocks and the bitmap includes 16 bits, it should be understood that data block set 110 may include other suitable numbers of data blocks, and the bitmap may also include other suitable numbers of bits, which are not limited in this disclosure. It should also be understood that the block sizes of first set 112 and second set 114 shown in FIG. 1 and FIG. 3 are only illustrative, and are not intended to limit the ratio of the numbers of the data blocks included in first set 112 and second set 114 in any way. However, in the storage system, the amount of data with low operating frequencies is usually greater than the amount of data with high operating frequencies. Therefore, first subset 112 may contain more data blocks than second subset 114. For example, first subset 112 may include 80% or 70% of the data blocks in data block set 110.

Figure 4:
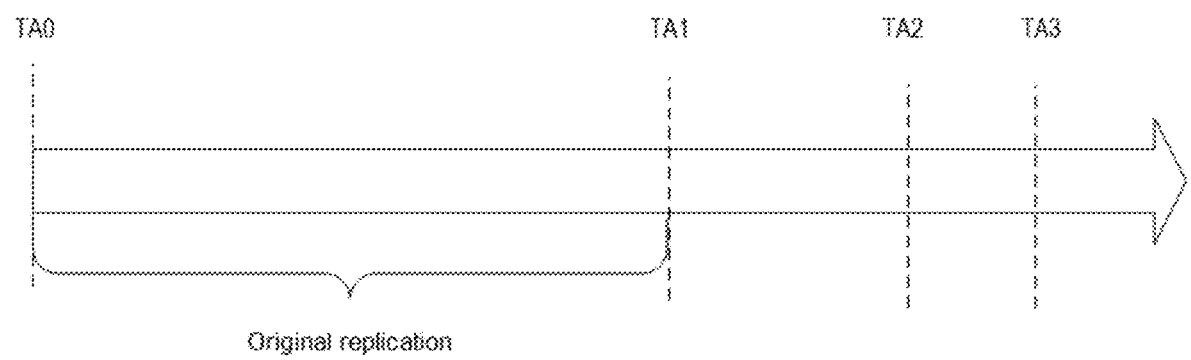
FIG. 4 shows a sequence diagram of asynchronous replication in the prior art.
Figure 5:
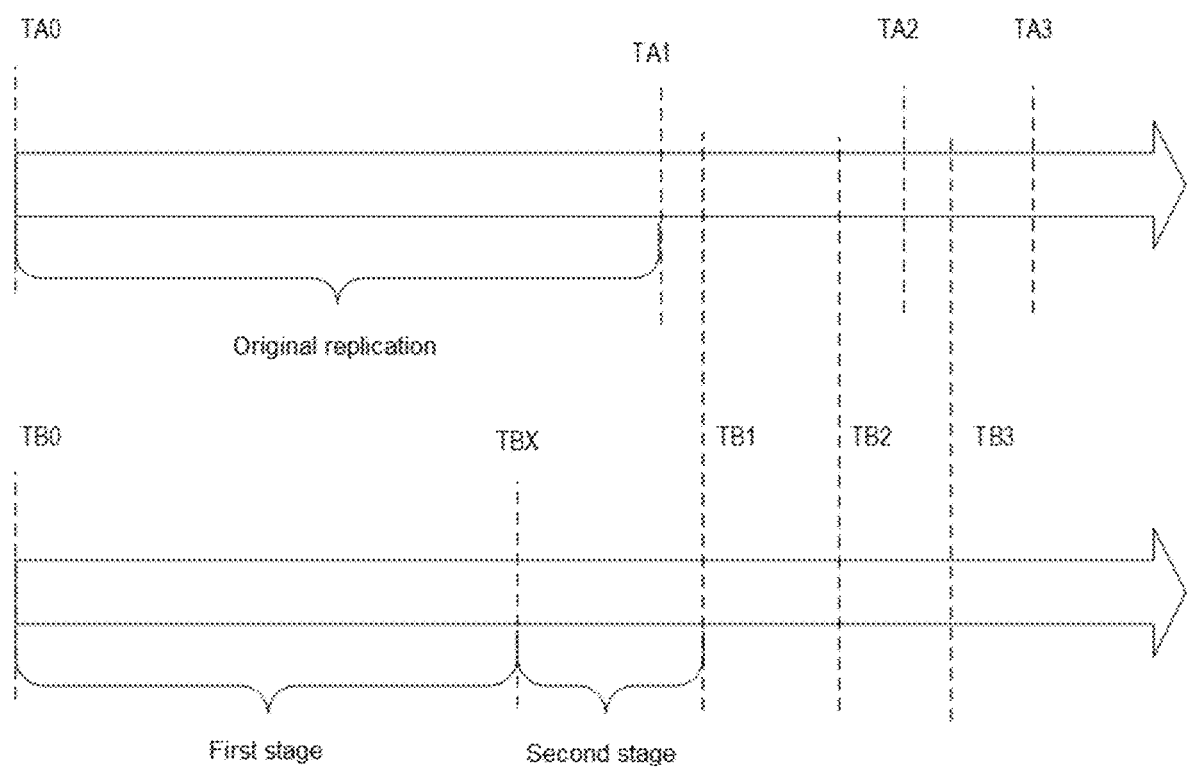
FIG. 5 shows comparison between a sequence diagram of asynchronous replication using a data replication method according to some embodiments of the present disclosure and a sequence diagram of asynchronous replication in the prior art.

The following describes the advantages of asynchronous replication using the data replication method according to some embodiments of the present disclosure over existing asynchronous replication in conjunction with FIG. 4 and FIG. 5. As shown in FIG. 4, the existing asynchronous replication needs to first obtain a snapshot of source data at a time point TA0, and perform a complete original replication from TA0 to TA1. In the case where the source data is large or the transmission bandwidth is small, the time taken for this original replication is usually very long, sometimes even as long as tens of days. At the moment when the source data is completely replicated to the target device at the time point TA1, the target device has a backup of the source data when a snapshot was created at the time point TA0. Thereafter, the electronic device obtains the current snapshot of the source data at the time point TA1, and performs incremental backup during TA1 to TA2 to back up data updated between TA0 to TA1 to the target device, and at the moment when the updated data is replicated to the target device at time TA2, the target device has the backup of the source data at time TA1. Similar to this, the incremental backup process between TA2 to TA3 and the subsequent incremental backup process will not be repeated.

It can be seen that because the existing asynchronous replication requires a long original replication time, if the source data is damaged at a certain point in time between TA1 and TA2 and needs to be restored and the target device only saves the data backup at the time point TA0 at the moment, the source data has to be rolled back to the data state at time TA0. This will cause the loss of all updated data from this time point to TA0, and the longer the original replication time is, the greater the amount of data loss will be.

In addition, users generally want that the storage system can complete incremental backups on a regular basis, such as an incremental backup every 1 hour, so as to obtain stable data protection capabilities. However, due to the long time between TA1 and TA0, a large amount of data will be updated during this period, which will cause the incremental backup between TA2 and TA1 to take a long time, for example, up to 5 hours. Similarly, this will further extend the time required for subsequent incremental backups. This is apparently difficult to meet the needs of the users.

FIG. 5 shows a comparison between asynchronous replication using a data replication method according to some embodiments of the present disclosure and the asynchronous replication in the prior art. For ease of comparison, the upper portion of FIG. 5 still shows a sequence diagram of the asynchronous replication in the prior art, while the lower portion of FIG. 5 shows a sequence diagram of the asynchronous replication using the data replication method according to some embodiments of the present disclosure.

In some embodiments, the electronic device may obtain the current snapshot of the source data at a time point TB0, and during the first stage from TB0 to TBX, data with a lower operating frequency in the source data is first replicated to the target device, and the data with the lower operating frequency may, for example, account for 80% of the source data. The electronic device then obtains the current snapshot of the source data at the time point TBX, and during the second stage from TBX to TB1, updated data in the source data and the remaining 20% of data with the higher operating frequency are replicated to the target device. In other words, the electronic device completes the original replication of the source data at the time point TB1, and the incremental backup performed between TB1 and TB2 only needs to back up the updated data between TBX and TB1. Similar to this, the incremental backup process between TB2 and TB3 and the subsequent incremental backup process will not be repeated.

Compared with the prior art, although the total time required for the original replication of the electronic device according to the embodiment of the present disclosure is slightly longer, the electronic device can provide more effective data protection. For example, if the source data is damaged at a certain time point between TB1 and TB2 and needs to be restored, because the target device has backed up the source data at time TBX at the moment, the source data only needs to be rolled back to the state at time TBX. There is no need to roll back to the original time TA0 as in the prior art, so the amount of data loss can be significantly reduced.

On the other hand, since the electronic device only needs to back up data updated between TBX and TB1 during the incremental backup from TB1 to TB2, the time required for the first incremental backup is greatly reduced, thereby reducing the time required for subsequent incremental backups, providing stable data protection capabilities and improving user experience.

Although in the example described above, the original replication is described as including two stages, it should be understood that the original replication may also include more similar replication stages. The operation principle of the more stages is similar to that of the two stages, which will not be described in detail in this disclosure.

Figure 6:
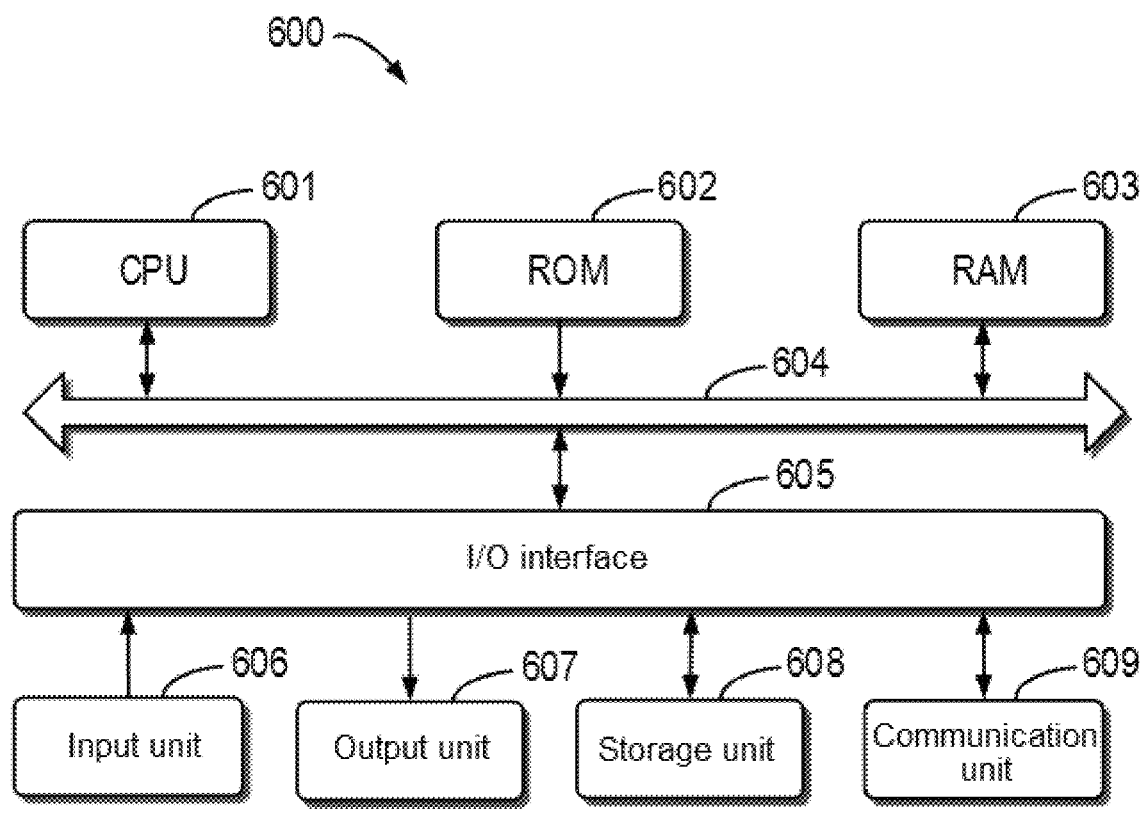
FIG. 6 shows a schematic block diagram of device 600 that may be configured to implement an embodiment of the present disclosure.

FIG. 6 shows a schematic block diagram of device 600 that may be configured to implement an embodiment of the present disclosure. Device 600 may be the above-described electronic device with reference to FIG. 1 to FIG. 4. As shown in the figure, device 600 includes central processing unit (CPU) 601 that can perform various appropriate actions and processing according to computer program instructions stored in read-only memory (ROM) 602 or computer program instructions loaded from storage unit 608 into random access memory (RAM) 603. In RAM 603, various programs and data required for the operation of device 600 can also be stored. CPU 601, ROM 602, and RAM 603 are connected to each other through bus 604. Input/output (I/O) interface 605 is also connected to bus 604.

Multiple components in device 600 are connected to I/O interface 605, including: input unit 606, such as a keyboard and a mouse; output unit 607, such as various types of displays and speakers; storage unit 608, such as a magnetic disk and an optical disk; and communication unit 609, such as a network card, a modem, and a wireless communication transceiver. Communication unit 609 allows device 600 to exchange information/data with other devices over a computer network such as the Internet and/or various telecommunication networks.

The methods or processes described above may be executed by processing unit 601. For example, in some embodiments, the methods can be implemented as a computer software program that is tangibly included in a machine-readable medium such as storage unit 608. In some embodiments, part or all of the computer programs may be loaded and/or installed onto device 600 via ROM 602 and/or communication unit 609. When the computer programs are loaded onto RAM 603 and executed by CPU 601, one or more steps or actions of the methods or processes described above may be performed.

In some embodiments, the methods and processes described above may be implemented as a computer program product. The computer program product may include a computer-readable storage medium with computer-readable program instructions for executing various aspects of the present disclosure loaded thereon.

The computer-readable storage medium may be a tangible device capable of retaining and storing instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium used here is not construed as transient signals per se, such as radio waves or other freely propagating electromagnetic waves, electromagnetic waves propagating through waveguides or other transmission media (e.g., optical pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions, such that the computer-readable program instructions are stored in the computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages and conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (e.g., connected through the Internet using an Internet service provider). In some embodiments, an electronic circuit, such as a programmable logic circuit, a field programmable gate array (FPGA), or a programmable logic array (PLA), can be customized by utilizing status information of the computer-readable program instructions. The electronic circuit may execute the computer-readable program instructions to implement various aspects of the present disclosure.

The computer-readable program instructions may be provided to a processing unit of a general purpose computer, a special purpose computer, or other programmable data processing apparatuses to produce a machine, such that the instructions, when executed by the processing unit of the computer or other programmable data processing apparatuses, generate an apparatus for implementing the functions/actions specified in one or more blocks in the flowcharts and/or block diagrams. The computer-readable program instructions may also be stored in a computer-readable storage medium, to cause a computer, a programmable data processing apparatus, and/or other devices to work in a specific manner, such that the computer-readable medium storing the instructions includes an article of manufacture that contains instructions for implementing various aspects of the functions/actions specified in one or more blocks in the flowcharts and/or block diagrams.

The computer-readable program instructions may also be loaded onto a computer, other programmable data processing apparatuses, or other devices, so that a series of operating steps are performed on the computer, other programmable data processing apparatuses, or other devices to produce a computer-implemented process, so that the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functionalities, and operations of possible implementations of the device, the method, and the computer program product according to a plurality of embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions marked in the blocks may also occur in an order different from that marked in the accompanying drawings. For example, two successive blocks may actually be performed basically in parallel, or they may be performed in an opposite order sometimes, depending on the functions involved. It should be further noted that each block in the block diagrams and/or flowcharts as well as a combination of blocks in the block diagrams and/or flowcharts may be implemented by using a dedicated hardware-based system for executing specified functions or actions or by a combination of dedicated hardware and computer instructions.

The embodiments of the present disclosure have been described above. The above description is illustrative, rather than exhaustive, and is not limited to the disclosed embodiments. Numerous modifications and alterations are apparent to those of ordinary skill in the art without departing from the scope and spirit of illustrated various embodiments. The selection of terms used herein is intended to best explain the principles and practical applications of the embodiments or the technological improvements to technologies on the market, or to enable other persons of ordinary skill in the art to understand the embodiments disclosed herein.

The invention claimed is:

1. A method for replicating data, comprising:
acquiring a first snapshot of a data block set, the first snapshot being a snapshot before a first subset of the data block set starts to be replicated;
acquiring a second snapshot of the data block set, the second snapshot being a snapshot of the data block set when replication of the first subset is completed;
determining, based at least in part on a difference between the second snapshot and the first snapshot, a second subset of the data block set, the second subset being different from the first subset, wherein the difference between the second snapshot and the first snapshot indicates data blocks in the first subset of the data block set that have changed during the replication of the first subset of the data block set, and wherein the second subset includes both the data blocks in the first subset of the data block set that have changed during the replication of the first subset of the data block set and data blocks in the data block set that have not yet been replicated; and
completing replication of the data block set by replicating the data blocks in the second subset of the data block set.

2. The method according to claim 1, further comprising:
acquiring operating frequencies of data blocks in the data block set; and
determining data blocks having an operating frequency lower than a threshold frequency as data blocks in the first subset.

3. The method according to claim 2, wherein the operating frequency comprises a data write-in frequency.

4. The method according to claim 1, wherein determining the second subset comprises:
determining a third subset of the data block set, the third subset comprising the data blocks in the first subset of the data block set that have changed during the replication of the first subset of the data block set;
determining a fourth subset of the data block set, the fourth subset comprising the data blocks in the data block set that have not been replicated; and
obtaining the second subset by merging the third subset and the fourth subset.

5. The method according to claim 4, wherein determining the third subset comprises:
determining data blocks associated with the difference between the second snapshot and the first snapshot as data blocks in the third subset.

6. The method according to claim 4, wherein determining the fourth subset comprises:
determining data blocks in the data block set other than the first subset as data blocks in the fourth subset.

7. An electronic device, comprising:
a processor; and
a memory storing computer program instructions, wherein the processor runs the computer program instructions in the memory to control the electronic device to perform actions comprising:
acquiring a first snapshot of a data block set, the first snapshot being a snapshot before a first subset of the data block set starts to be replicated;
acquiring a second snapshot of the data block set, the second snapshot being a snapshot of the data block set when replication of the first subset is completed;
determining, based at least in part on a difference between the second snapshot and the first snapshot, a second subset of the data block set, the second subset being different from the first subset, wherein the difference between the second snapshot and the first snapshot indicates data blocks in the first subset of the data block set that have changed during the replication of the first subset of the data block set, and wherein the second subset includes both the data blocks in the first subset of the data block set that have changed during the replication of the first subset of the data block set and data blocks in the data block set that have not yet been replicated; and
completing replication of the data block set by replicating the data blocks in the second subset of the data block set.

8. The electronic device according to claim 7, wherein the actions further comprise:
acquiring operating frequencies of data blocks in the data block set; and determining data blocks having an operating frequency lower than a threshold frequency as data blocks in the first subset.

9. The electronic device according to claim 8, wherein the operating frequency comprises a data write-in frequency.

10. The electronic device according to claim 7, wherein determining the second subset comprises:
    determining a third subset of the data block set, the third subset comprising the data blocks in the first subset of the data block set that have changed during the replication of the first subset of the data block set;
    determining a fourth subset of the data block set, the fourth subset comprising the data blocks in the data block set that have not yet been replicated; and
    obtaining the second subset by merging the third subset and the fourth subset.

11. The electronic device according to claim 10, wherein determining the third subset comprises:
    determining data blocks associated with the difference between the second snapshot and the first snapshot as data blocks in the third subset.

12. The electronic device according to claim 10, wherein determining the fourth subset comprises:
    determining data blocks in the data block set other than the first subset as data blocks in the fourth subset.

13. A computer program product tangibly stored in a non-transitory computer storage medium and comprising machine-executable instructions, wherein the machine-executable instructions, when executed by a device, cause the device to perform actions comprising:
    acquiring a first snapshot of a data block set, the first snapshot being a snapshot before a first subset of the data block set starts to be replicated;
    acquiring a second snapshot of the data block set, the second snapshot being a snapshot of the data block set when replication of the first subset is completed;
    determining, based at least in part on a difference between the second snapshot and the first snapshot, a second subset of the data block set, the second subset being different from the first subset, wherein the difference between the second snapshot and the first snapshot indicates data blocks in the first subset of the data block set that have changed during the replication of the first subset of the data block set, and wherein the second subset includes both the data blocks in the first subset of the data block set that have changed during the replication of the first subset of the data block set and data blocks in the data block set that have not yet been replicated; and
    completing replication of the data block set by replicating the data blocks in the second subset of the data block set.

14. The computer program product according to claim 13, wherein the actions further comprise:
    acquiring operating frequencies of data blocks in the data block set; and
    determining data blocks having an operating frequency lower than a threshold frequency as data blocks in the first subset.

15. The computer program product according to claim 14, wherein the operating frequency comprises a data write-in frequency.

16. The computer program product according to claim 13, wherein determining the second subset comprises:
    determining a third subset of the data block set, the third subset comprising the data blocks in the first subset of the data block set that have changed during the replication of the first subset of the data block set;
    determining a fourth subset of the data block set, the fourth subset comprising the data blocks in the data block set that have not been replicated; and
    obtaining the second subset by merging the third subset and the fourth subset.

17. The computer program product according to claim 16, wherein determining the third subset comprises:
    determining data blocks associated with the difference between the second snapshot and the first snapshot as data blocks in the third subset.

18. The computer program product according to claim 16, wherein determining the fourth subset comprises:
    determining data blocks in the data block set other than the first subset as data blocks in the fourth subset.

* * * * *